US012793863B2

(12) United States Patent
Pamplin et al.

(10) Patent No.: US 12,793,863 B2
(45) Date of Patent: Nov. 10, 2026

(54) EXTRACTION OF FISSION PRODUCTS FROM MOLTEN SALT VIA REDOX REACTION WITH REDUCING AGENTS

(71) Applicant: ABILENE CHRISTIAN UNIVERSITY, Abilene, TX (US)

(72) Inventors: Kim Pamplin, Abilene, TX (US); Diego Zometa, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 0 days.

(21) Appl. No.: 18/783,094

(22) Filed: Jul. 24, 2024

(65) Prior Publication Data

US 2025/0037889 A1 Jan. 30, 2025

Related U.S. Application Data

(60) Provisional application No. 63/515,674, filed on Jul. 26, 2023.

(51) Int. Cl.
*G21C 19/31* (2006.01)
*G21C 19/307* (2006.01)

(52) U.S. Cl.
CPC ........... *G21C 19/31* (2013.01); *G21C 19/307* (2013.01)

(58) Field of Classification Search
CPC ....... G21C 19/30; G21C 19/307; G21C 19/31
USPC ................................................. 376/310, 311
See application file for complete search history.

(56) References Cited

U.S. PATENT DOCUMENTS

| | | | | |
|---|---|---|---|---|
| 2,795,482 A | | 6/1957 | McNabney | |
| 3,105,020 A | | 9/1963 | Long | |
| 3,105,028 A | | 9/1963 | Long | |
| 3,473,897 A | * | 10/1969 | Grimes | G21C 19/50 376/311 |

(Continued)

FOREIGN PATENT DOCUMENTS

| | | |
|---|---|---|
| CA | 3179052 | 11/2021 |
| CA | 3085050 | 12/2021 |

(Continued)

OTHER PUBLICATIONS

Compere, E. L., et al. Fission product behavior in the molten salt reactor experiment. No. ORNL-4865. Oak Ridge National Lab. (ORNL), Oak Ridge, TN (United States), 1975. (Year: 1975).*

(Continued)

*Primary Examiner* — Jinney Kil
(74) *Attorney, Agent, or Firm* — King & Spalding

(57) ABSTRACT

The present invention is directed to a fission product extraction system operable to capture and extract fission products from a flow of irradiated fueled molten salt of a molten salt reactor. The example extraction systems described herein utilize electroless deposition to chemically plate fission products onto a metallic structure. The metallic structure may be partially coated with a reducing agent, such as beryllium to provide an electron source for the fission products. The metallic structure may be a component of an extraction system designed to facilitate submersion of the metallic structure into the flow of molten salt. The extraction system may also be designed to facilitate removal of the metallic structure without requiring a shut down or slowdown of the reactor system.

15 Claims, 7 Drawing Sheets

(56) References Cited

U.S. PATENT DOCUMENTS

| | | | | |
|---|---|---|---|---|
| 3,521,959 | A | 7/1970 | Fassel et al. | |
| 3,640,845 | A * | 2/1972 | Ripley | G21C 7/16 137/842 |
| 3,730,833 | A | 5/1973 | Cremeans | |
| 3,843,765 | A | 10/1974 | Anderson | |
| 4,005,178 | A | 1/1977 | LeBlanc | |
| 4,069,100 | A | 1/1978 | Cooper | |
| 4,075,060 | A | 2/1978 | Colburn | |
| 4,094,953 | A | 6/1978 | Hadi et al. | |
| 4,332,170 | A | 6/1982 | Belval | |
| 4,497,848 | A | 2/1985 | Baran | |
| 4,539,846 | A | 9/1985 | Grossman | |
| 4,783,997 | A | 11/1988 | Lynnworth | |
| 5,702,228 | A * | 12/1997 | Tamai | H10P 72/7602 414/744.5 |
| 5,741,429 | A | 4/1998 | Donadio | |
| 6,125,912 | A | 10/2000 | Branagan et al. | |
| 6,143,431 | A | 11/2000 | Webster | |
| 6,258,185 | B1 | 7/2001 | Branagan et al. | |
| 6,303,193 | B1 | 10/2001 | Guida | |
| 6,318,192 | B1 | 11/2001 | Carbone | |
| 6,372,293 | B1 | 4/2002 | Mathus | |
| 6,490,927 | B2 | 12/2002 | Braunling et al. | |
| 6,983,654 | B2 | 1/2006 | Balin | |
| 7,011,736 | B1 | 3/2006 | Miller et al. | |
| 7,322,251 | B2 | 1/2008 | Gysling et al. | |
| 7,354,519 | B1 | 4/2008 | Frank | |
| 7,914,600 | B2 | 3/2011 | Withers et al. | |
| 7,960,581 | B2 | 6/2011 | Vreede et al. | |
| 8,226,760 | B2 | 7/2012 | Collier et al. | |
| 8,442,182 | B2 | 5/2013 | Peterson | |
| 8,636,892 | B2 | 1/2014 | Koehl et al. | |
| 8,746,440 | B2 | 6/2014 | Williamson et al. | |
| 8,771,482 | B2 | 7/2014 | Bailey et al. | |
| 8,821,824 | B2 | 9/2014 | Ghirelli et al. | |
| 8,900,439 | B2 | 12/2014 | Wiedmeyer et al. | |
| 8,956,524 | B2 | 2/2015 | Wiedmeyer et al. | |
| 8,968,547 | B2 | 3/2015 | Loewen et al. | |
| 9,017,527 | B2 | 4/2015 | Wiedmeyer et al. | |
| 9,228,579 | B2 | 1/2016 | Stobbe | |
| 9,295,923 | B2 | 3/2016 | Mezheritsky et al. | |
| 9,299,464 | B2 | 3/2016 | Venneri | |
| 9,305,673 | B2 | 4/2016 | Heinold et al. | |
| 9,347,807 | B2 | 5/2016 | Ao | |
| 9,368,244 | B2 | 6/2016 | Wooley | |
| 9,475,706 | B2 | 10/2016 | Policke et al. | |
| 9,620,248 | B2 | 4/2017 | Venneri | |
| 9,638,607 | B1 | 5/2017 | Hawthorne et al. | |
| 9,847,149 | B2 | 12/2017 | Spoerke et al. | |
| 9,941,025 | B2 | 4/2018 | Ahlfeld et al. | |
| 9,968,899 | B1 | 5/2018 | Gellaboina | |
| 10,032,528 | B2 | 7/2018 | Venneri | |
| 10,056,160 | B2 | 8/2018 | LeBlanc | |
| 10,109,378 | B2 | 10/2018 | Snead | |
| 10,109,382 | B2 | 10/2018 | Hackett et al. | |
| 10,141,079 | B2 | 11/2018 | Czerwinski et al. | |
| 10,221,499 | B2 | 3/2019 | Miller et al. | |
| 10,280,527 | B2 | 5/2019 | Loewen et al. | |
| 10,317,262 | B2 | 6/2019 | Kippersund | |
| 10,388,419 | B2 | 8/2019 | Sakuma et al. | |
| 10,416,045 | B2 | 9/2019 | Launiere et al. | |
| 10,434,494 | B2 | 10/2019 | Kobayashi et al. | |
| 10,438,705 | B2 | 10/2019 | Cheatham, III | |
| 10,475,543 | B2 | 11/2019 | Venneri | |
| 10,566,096 | B2 | 2/2020 | Czerwinski | |
| 10,566,101 | B2 | 2/2020 | Corpora | |
| 10,573,416 | B2 | 2/2020 | Venneri | |
| 10,685,750 | B2 | 6/2020 | Eichel et al. | |
| 10,830,689 | B2 | 11/2020 | Hedtke | |
| 10,878,971 | B2 | 12/2020 | Venneri | |
| 11,101,048 | B2 | 8/2021 | Venneri | |
| 11,136,245 | B2 | 10/2021 | Benson | |
| 11,170,901 | B2 | 11/2021 | Cheatham, III | |
| 11,189,383 | B2 | 11/2021 | Snead | |
| 11,200,991 | B2 | 12/2021 | LeBlanc | |
| 11,226,281 | B1 | 1/2022 | Findikoglu et al. | |
| 11,276,503 | B2 | 3/2022 | Cisneros | |
| 11,286,172 | B2 | 3/2022 | Russell et al. | |
| 11,373,765 | B2 | 6/2022 | Czerwinski | |
| 11,459,662 | B2 | 10/2022 | Murahara | |
| 11,501,883 | B2 | 11/2022 | Eichel et al. | |
| 11,996,208 | B2 | 5/2024 | Cheatham, III | |
| 12,100,523 | B2 | 9/2024 | Callaway | |
| 12,254,994 | B1 | 3/2025 | Badalassi | |
| 2004/0093957 | A1 | 5/2004 | Griffin et al. | |
| 2005/0092070 | A1 | 5/2005 | Bhatti | |
| 2006/0000071 | A1 | 1/2006 | Lin | |
| 2006/0023829 | A1 | 2/2006 | Schnetner | |
| 2008/0181351 | A1 | 7/2008 | Hosokawa | |
| 2009/0046825 | A1 | 2/2009 | Dulka et al. | |
| 2011/0045971 | A1 | 2/2011 | Withers | |
| 2012/0051481 | A1 | 3/2012 | Shu | |
| 2012/0302811 | A1 | 11/2012 | Long | |
| 2014/0044624 | A1 | 2/2014 | Ghirelli | |
| 2014/0226775 | A1 | 8/2014 | DeVolpi | |
| 2015/0040727 | A1 | 2/2015 | Kosslow | |
| 2015/0107371 | A1 | 4/2015 | Khrakovsky | |
| 2015/0243376 | A1 | 8/2015 | Wilson | |
| 2015/0310948 | A1 | 10/2015 | Venneri | |
| 2016/0189806 | A1 * | 6/2016 | Cheatham, III | G21C 19/303 376/213 |
| 2016/0189812 | A1 | 6/2016 | Czerwinski | |
| 2016/0189816 | A1 | 6/2016 | Czerwinski | |
| 2016/0196888 | A1 | 7/2016 | Spoerke | |
| 2016/0217874 | A1 | 7/2016 | Dewan et al. | |
| 2017/0084355 | A1 | 3/2017 | Scott | |
| 2017/0271033 | A1 | 9/2017 | Dodson et al. | |
| 2017/0292179 | A1 | 10/2017 | Hackett | |
| 2017/0294241 | A1 | 10/2017 | Dodson et al. | |
| 2017/0294242 | A1 | 10/2017 | Simpson et al. | |
| 2017/0301413 | A1 | 10/2017 | Cisneros, Jr. | |
| 2017/0301418 | A1 | 10/2017 | Dodson | |
| 2018/0254109 | A1 | 9/2018 | Cheatham, III et al. | |
| 2019/0015806 | A1 | 1/2019 | Gellaboina | |
| 2019/0057783 | A1 | 2/2019 | LeBlanc | |
| 2019/0107459 | A1 | 4/2019 | Lin | |
| 2019/0139665 | A1 | 5/2019 | Czerwinski et al. | |
| 2019/0371482 | A1 | 12/2019 | Benson et al. | |
| 2020/0087156 | A1 | 3/2020 | Kelleher | |
| 2020/0118698 | A1 | 4/2020 | Czerwinski et al. | |
| 2020/0122109 | A1 | 4/2020 | Kruizenga | |
| 2020/0161015 | A1 | 5/2020 | Czerwinski et al. | |
| 2020/0180975 | A1 | 6/2020 | Benson | |
| 2020/0243207 | A1 | 7/2020 | Jiang | |
| 2020/0330260 | A1 | 10/2020 | Hansen | |
| 2021/0130181 | A1 | 5/2021 | Brown et al. | |
| 2021/0210235 | A1 | 7/2021 | Venneri | |
| 2022/0005617 | A1 | 1/2022 | Snead | |
| 2022/0051818 | A1 | 2/2022 | Cisneros, Jr. | |
| 2022/0139577 | A1 | 5/2022 | Cisneros, Jr. et al. | |
| 2022/0139578 | A1 | 5/2022 | Yeager | |
| 2022/0223302 | A1 | 7/2022 | De Groot | |
| 2022/0250936 | A1 | 8/2022 | Benson | |
| 2022/0310281 | A1 | 9/2022 | Czerwinski | |
| 2022/0390334 | A1 | 12/2022 | Jorgensen | |
| 2023/0042504 | A1 | 2/2023 | Jiang | |
| 2023/0088516 | A1 | 3/2023 | Bailey | |
| 2023/0104365 | A1 | 4/2023 | Eichel et al. | |
| 2023/0154636 | A1 | 5/2023 | Johnson | |
| 2023/0245794 | A1 | 8/2023 | Moskowitz | |
| 2023/0368933 | A1 | 11/2023 | Harb | |
| 2023/0392274 | A1 | 12/2023 | Tilton | |
| 2024/0071639 | A1 | 2/2024 | Callaway | |
| 2024/0127973 | A1 | 4/2024 | Davis | |
| 2024/0167919 | A1 | 5/2024 | Biegalski | |
| 2024/0282473 | A1 | 8/2024 | Callaway | |
| 2024/0312656 | A1 * | 9/2024 | Pamplin | G21C 19/31 |
| 2024/0347222 | A1 | 10/2024 | Czerwinski | |
| 2024/0355488 | A1 | 10/2024 | Yeager | |
| 2024/0395426 | A1 | 11/2024 | Welter | |
| 2024/0401886 | A1 | 12/2024 | Silvioli | |
| 2024/0408548 | A1 | 12/2024 | Tilton | |
| 2024/0428961 | A1 | 12/2024 | Pamplin | |
| 2025/0018367 | A1 | 1/2025 | Frattini | |

(56) References Cited

U.S. PATENT DOCUMENTS

| | | | | |
|---|---|---|---|---|
| 2025/0037889 | A1 | 1/2025 | Pamplin | |
| 2025/0109035 | A1 | 4/2025 | Pamplin | |
| 2025/0111957 | A1* | 4/2025 | Pamplin | G21C 1/22 |
| 2025/0182919 | A1 | 6/2025 | Fitzgerald | |
| 2025/0191800 | A1 | 6/2025 | Dunckley | |
| 2025/0218608 | A1 | 7/2025 | Volpe | |
| 2025/0246334 | A1 | 7/2025 | Botha | |
| 2025/0266182 | A1 | 8/2025 | Czerwinski | |
| 2025/0273355 | A1 | 8/2025 | Czerwinski | |
| 2025/0273356 | A1 | 8/2025 | Czerwinski | |
| 2026/0004943 | A1 | 1/2026 | Johnson | |

FOREIGN PATENT DOCUMENTS

| | | | |
|---|---|---|---|
| CA | 3247722 | | 6/2025 |
| CN | 101376528 | | 3/2009 |
| CN | 101631642 | | 1/2010 |
| CN | 203080087 | U | 7/2013 |
| CN | 203400551 | | 1/2014 |
| CN | 102967494 | B | 4/2015 |
| CN | 103714371 | B | 5/2016 |
| CN | 104090004 | B | 5/2016 |
| CN | 106128533 | A | 11/2016 |
| CN | 106283112 | A | 1/2017 |
| CN | 106425315 | A | 2/2017 |
| CN | 107230506 | A | 10/2017 |
| CN | 106158053 | B | 11/2017 |
| CN | 107344726 | A | 11/2017 |
| CN | 106180254 | B | 6/2018 |
| CN | 108172318 | A | 6/2018 |
| CN | 108389634 | A | 8/2018 |
| CN | 109141969 | A | 1/2019 |
| CN | 109173419 | | 1/2019 |
| CN | 109207128 | A | 1/2019 |
| CN | 105838339 | B | 3/2019 |
| CN | 109509562 | A | 3/2019 |
| CN | 106621429 | B | 4/2019 |
| CN | 106840765 | A | 4/2019 |
| CN | 109671510 | A | 4/2019 |
| CN | 106902526 | B | 6/2019 |
| CN | 106477618 | B | 7/2019 |
| CN | 110042434 | A | 7/2019 |
| CN | 105420737 | B | 9/2019 |
| CN | 105463306 | B | 9/2019 |
| CN | 106221678 | B | 9/2019 |
| CN | 108179432 | B | 9/2019 |
| CN | 110194494 | A | 9/2019 |
| CN | 107469628 | B | 10/2019 |
| CN | 108109710 | B | 10/2019 |
| CN | 209496626 | U | 10/2019 |
| CN | 108231224 | B | 12/2019 |
| CN | 108511089 | B | 12/2019 |
| CN | 106517097 | B | 2/2020 |
| CN | 110783010 | A | 2/2020 |
| CN | 210803355 | U | 6/2020 |
| CN | 108956744 | B | 7/2020 |
| CN | 109637682 | B | 9/2020 |
| CN | 106957636 | B | 10/2020 |
| CN | 110203886 | B | 10/2020 |
| CN | 109011696 | B | 12/2020 |
| CN | 112062567 | A | 12/2020 |
| CN | 112111251 | A | 12/2020 |
| CN | 112284170 | A | 1/2021 |
| CN | 112322939 | A | 2/2021 |
| CN | 112357885 | A | 2/2021 |
| CN | 108956443 | B | 3/2021 |
| CN | 109097001 | B | 3/2021 |
| CN | 110689984 | B | 3/2021 |
| CN | 109231241 | B | 4/2021 |
| CN | 110444311 | B | 5/2021 |
| CN | 112778012 | A | 5/2021 |
| CN | 108088813 | B | 6/2021 |
| CN | 112946046 | A | 6/2021 |
| CN | 113174240 | A | 7/2021 |
| CN | 213707743 | U | 7/2021 |
| CN | 109680282 | B | 9/2021 |
| CN | 113372886 | A | 9/2021 |
| CN | 112391653 | B | 11/2021 |
| CN | 113630582 | A | 11/2021 |
| CN | 111334258 | B | 12/2021 |
| CN | 113732294 | | 12/2021 |
| CN | 113851246 | | 12/2021 |
| CN | 113860350 | A | 12/2021 |
| CN | 111627571 | B | 2/2022 |
| CN | 112125281 | B | 2/2022 |
| CN | 114086111 | A | 2/2022 |
| CN | 215770541 | U | 2/2022 |
| CN | 112695229 | B | 3/2022 |
| CN | 112429772 | B | 5/2022 |
| CN | 112479256 | B | 5/2022 |
| CN | 111141670 | B | 6/2022 |
| CN | 111627569 | B | 7/2022 |
| CN | 112853100 | | 7/2022 |
| CN | 114813222 | A | 7/2022 |
| CN | 111785407 | | 8/2022 |
| CN | 112530614 | B | 8/2022 |
| CN | 112700895 | B | 8/2022 |
| CN | 114842989 | A | 8/2022 |
| CN | 112151197 | B | 9/2022 |
| CN | 112891973 | B | 9/2022 |
| CN | 113044378 | B | 9/2022 |
| CN | 114288837 | B | 9/2022 |
| CN | 217405118 | U | 9/2022 |
| CN | 112316724 | | 11/2022 |
| CN | 112551567 | B | 11/2022 |
| CN | 112992389 | B | 11/2022 |
| CN | 113603059 | B | 11/2022 |
| CN | 112587989 | B | 12/2022 |
| CN | 112863725 | B | 12/2022 |
| CN | 112863726 | B | 12/2022 |
| CN | 113241200 | B | 12/2022 |
| CN | 117690627 | | 3/2024 |
| DE | 102010021605 | | 11/2011 |
| EP | 0170033 | | 5/1986 |
| EP | 0911834 | | 4/1999 |
| EP | 2788292 | | 3/2017 |
| EP | 4054981 | | 2/2024 |
| EP | 4235697 | | 2/2024 |
| EP | 4324003 | | 2/2024 |
| EP | 4338174 | | 3/2024 |
| EP | 4348684 | | 4/2024 |
| EP | 3855454 | | 10/2024 |
| EP | 4018014 | | 12/2024 |
| EP | 4523229 | | 3/2025 |
| EP | 4562209 | | 6/2025 |
| EP | 4670192 | | 12/2025 |
| RU | 2499306 | | 11/2013 |
| RU | 215749 | | 12/2022 |
| WO | WO 2015017928 | | 2/2015 |
| WO | WO 2015094450 | | 10/2015 |
| WO | WO 2017019620 | | 2/2017 |
| WO | WO 2017032379 | | 3/2017 |
| WO | WO 2017106509 | | 6/2017 |
| WO | WO 2017171937 | | 10/2017 |
| WO | WO 2017172177 | | 10/2017 |
| WO | WO 2017172948 | | 10/2017 |
| WO | WO 2017192611 | | 11/2017 |
| WO | WO 2018/001469 | | 1/2018 |
| WO | WO 2017199059 | | 2/2018 |
| WO | WO 2018026536 | | 2/2018 |
| WO | WO 2018027170 | | 2/2018 |
| WO | WO 2018031148 | | 2/2018 |
| WO | WO 2018031681 | | 2/2018 |
| WO | WO 2018052529 | | 3/2018 |
| WO | WO 2018064572 | | 4/2018 |
| WO | WO 2018169588 | | 10/2018 |
| WO | WO 2018213669 | | 1/2019 |
| WO | WO 2019231971 | | 1/2020 |
| WO | WO 2020123513 | | 8/2020 |
| WO | WO 2022006169 | | 1/2022 |
| WO | WO 2022076084 | | 6/2022 |

(56) References Cited

FOREIGN PATENT DOCUMENTS

| | | |
|---|---|---|
| WO | WO 2022146446 | 7/2022 |
| WO | WO 2024217652 | 10/2024 |

OTHER PUBLICATIONS

Liu, Ya-Lan, et al. "Electrochemical behavior of La (III) on the zinc-coated W electrode in LiCl—KCl eutectic" Electrochimica Acta 168 (2015): 206-215. (Year: 2015).*

Afonichkin, Valery K., et al. "Dynamic reference electrode for investigation of fluoride melts containing beryllium difluoride." Journal of Fluorine Chemistry 130.1 (2009): 83-88. (Year: 2009).*

Clark, Austin David, et al. "Complexation of Mo in FLiNaK molten salt: insight from ab initio molecular dynamics." The Journal of Physical Chemistry B 125.1 (2020): 211-218. (Year: 2020).*

Mcdonald. "Challenges of Extracting and Purifying Fission-Produced Molybdenum-99" 3146-3150. Industrial & Engineering Chemistry Research. Jul. 29, 2000.

Rao. "Studies on separation and purification offission 99Mo from neutron activated uranium aluminum alloy" 186-191. Applied Radiation and Isotopes. Jul. 2014; <abstract; p. 187, col. 2, last paragraph; p. 188.

Cheng et. al. Molten salt-assisted carbonized zeolite imidazolate framework on nickel foam for highly efficient iodide capture in fluoride molten salts (2023), Chemical Engineering Journal 477, (2023).

Hoyt, N. et al. "Online Monitoring of Molten Salt Reactors," Argonne National Laboratory (2019).

Furuichi et al. "Study on behavior of tritium in concrete wall," Journal of nuclear materials 350.3 (2006): 246-253.

H. Zhou, J. R. Long, O. M. Yaghi (2012). "Introduction to Metal-Organic Frameworks." Chemical Re-views. Chem. Rev. 2012, 112, 673-674.

Medha Kasula, Tin Le, Adrienne Thomsen, Milad Rabbani Esfahani (2022). "Silver metal organic frameworks and copper metal organic frameworks immobilized on graphene oxide for enhanced adsorption in water treatment." Chemical Engineering Journal, vol. 439, 2022, 135542, ISSN 1385-8947.

V. Sanderyd (2018). "Novel Hybrid Nanomaterials—Combining Mesoporous Magnesium Carbonate and Metal-Organic Frameworks." UPPSALA Universitet.

Osama Abuzalat et al. (2018). Sonochemical fabrication of Cu(II) and Zn(II) metal-organic framework films on metal substrates, *Ultrasonics Sonochemistry*, vol. 45, 2018, pp. 180-188, ISSN 1350-4177.

Mahboobeh Tanhaei, et al. , (2019), Energy-efficient sonochemical approach for the preparation of na-nohybrid composites from graphene oxide and metal-organic framework, Inorganic Chemistry Communications, vol. 102, 2019, pp. 185-191, ISSN 1387-7003.

Harkema et al. Development and Demonstration of a Prototype Molten Salt Sampling System. Idaho National Laboratory [online]. Jan. 2023.

* cited by examiner

EXTRACTION OF FISSION PRODUCTS FROM MOLTEN SALT VIA REDOX REACTION WITH REDUCING AGENTS

RELATED APPLICATION

The present application relates and claims priority to U.S. Provisional Application No. 63/515,674, filed on Jul. 26, 2023, which is hereby incorporated by reference in its entirety.

TECHNICAL FIELD

The present application relates generally to systems and methods for removing fission products from a molten salt reactor, and in particular, to systems and methods for removing fission products from a molten salt using redox reactions with reducing agents.

BACKGROUND

Molten salt reactors (MSRs) offer an approach to nuclear power that utilizes molten salts as their nuclear fuel in place of the conventional solid fuel rods used in light water reactors. Advantages include efficient fuel utilization and enhanced safety (largely due to replacing water as a coolant with molten salt). In an MSR, fission reactions occur within a molten salt composition housed within a reactor vessel. The fission of uranium-235 (U-235) produces a spectrum of fission products, including molybdenum-99 (Mo-99), iodine-131 (I-131) and xenon-133 (Xe-133). Once produced, the Mo-99 atoms and other fission products are present in the irradiated fueled molten salt as various different species. For example, some Mo-99 atoms may be a solid (alone or in a compound) suspended in the irradiated fueled molten salt ($Mo^0$, $MoF_3$, $MoF_4$, $MoF_5$), some may be dissolved in the irradiated fueled molten salt ($Mo^{+6}$) some may be a gaseous molybdenum hexafluoride, and some may plate out as a metal.

The decay product of Mo-99, technetium-99m (Tc-99m), is used in at least two-thirds of all diagnostic medical isotope procedures. Tc-99m is used for detection of disease and for the study of organ structure and function. Tc-99m has a half-life of about 6 hours and emits 140 keV photons when it decays to Tc-99, a radioactive isotope with an approximately 214,000-year half-life. This photon energy is useful for detection by scintillation instruments such as gamma cameras, and the data collected by the cameras are analyzed to produce structural and functional images. Nuclear reactors provide an efficient source of thermal neutrons for Mo-99 production. Given the short half-life of Tc-99m, it is advantageous to collect Mo-99 from nuclear reactors.

For fission products that are dissolved in the molten salt, there remains a need for an improved system and method to remove the dissolved fission products from the irradiated fueled molten salt while the molten salt reactor is online.

SUMMARY OF THE INVENTION

In one example, a fission product extraction system is disclosed. The example fission product extraction system includes a pipe connected to a coolant loop of a reactor system. The coolant loop facilitates flow of coolant comprising fission products. The example fission product extraction system may further include a metallic structure extending from the pipe into the coolant loop. The metallic structure is at least partially coated with a reducing agent. The example fission product extraction system is operable to capture the fission products from the coolant by electroless deposition of the fission products onto the metallic structure.

In another example, the pipe is connected to a bypass of the coolant loop and the bypass includes a bypass valve configured to facilitate selective flow of the coolant to the bypass.

In another example, the bypass is downstream of a reactor core of the reactor system.

In another example, the fission product extraction system includes a removable attachment rod connected to the metallic structure operable to facilitate removal of the metallic structure from the coolant loop.

In another example, the fission product extraction system includes a capture system valve configured to enable passage of the metallic structure and the removable attachment rod when in an open position.

In another example, the salt barrier is connected to a top portion of the removable attachment rod and is a nonpermeable disk with a diameter about a size of a diameter of the pipe, such that the salt barrier cannot extend through the capture system valve and thereby limits the length to which the metallic structure may extend into the coolant loop.

In another example, the metallic structure is partially coated with a reducing agent and partially uncoated.

In another example, the metallic structure is positioned within the coolant loop such that the coolant contacts the uncoated portion before it contacts the coated portion.

In another example, the metallic structure is in the shape of a cone and includes a vertex that is uncoated and a base that is coated with the reducing agent.

In another example, the metallic structure is a hollow capsule shape that includes an exterior portion that is uncoated and includes an interior portion that is coated with the reducing agent.

In another example, the metallic structure includes an opening to the interior portion of the metallic structure and wherein the opening is positioned on an end side of the metallic structure downstream of a front side of the metallic structure.

In another example, the removable attachment rod comprises a non-conducting material causing the metallic structure to be electrically isolated from structures of the reactor system.

In one example, a system is disclosed. The example system includes a fuel salt system configured to circulate an irradiated fueled molten salt comprising fission products through a molten salt loop of a molten salt reactor system, wherein the molten salt loop comprises piping, an access vessel, a reactor core, a pump, and at least one heat exchanger. The example system further includes a fission product extraction system fluidly coupled to piping of the molten salt loop, the fission product extraction system. The fission product extraction system includes a pipe connected to the piping of the molten salt loop. The fission product extraction system further includes a metallic structure partially coated in a reducing agent extending from the pipe into the piping of the molten salt loop such that the metallic structure makes contact with the irradiated fueled molten salt. The metallic structure is connected to a removable rod of the fission product extraction system. The fission product extraction system is operable to capture the fission products by redox reaction between the reducing agent and the fission products such that the fission products plate onto the metallic structure.

In another example, the metallic structure is configured to release the reducing agent into the irradiated fueled molten salt upon redox reaction with the fission products.

In another example, the fission products are one or more of molybdenum-99, actinium-225, iodine-131, xenon-133, hydrogen-3, nitrogen-13, carbon-14, oxygen-15, fluorine-18, gallium-67, gallium-68, selenium-75, krypton-81m, strontium-89, yttrium-90, technetium-99m, indium-111, iodine-123, iodine-125, samarium-153, erbium-169, and radium-223.

In another example, the reducing agent comprises at least one of beryllium, lithium, and zirconium.

In another example, the redox reaction occurs between cationic molybdenum and neutral beryllium.

In one example, a method for capturing fission products from irradiated fueled molten salt of a molten salt reactor system is disclosed. The example method includes circulating a flow of irradiated fueled molten salt through a molten salt loop of the molten salt reactor system. The irradiated fueled molten salt comprises fission products. The example method further includes inserting a metallic structure into piping of the molten salt loop, wherein the metallic structure is at least partially coated in a reducing agent. The example method further includes capturing the fission products on the metallic structure via a chemical redox reaction between at least the reducing agent and the fission products. The example method further includes removing the metallic structure from the piping of the molten salt loop.

In another example, the reducing agent comprises beryllium and the fission products comprise molybdenum.

DETAILED DESCRIPTION

Figure 1:
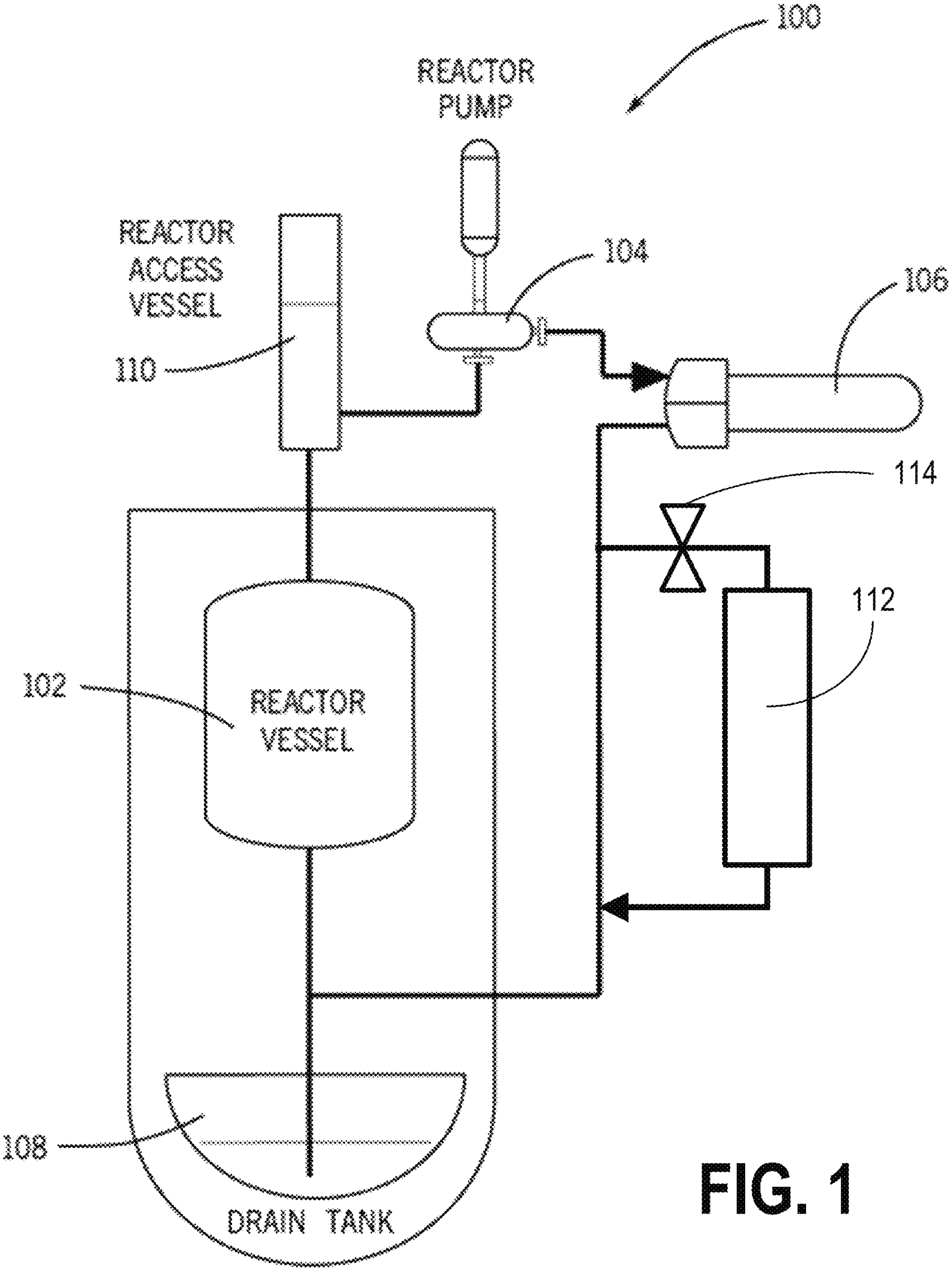
FIG. 1 depicts an example molten salt reactor system.

The description that follows includes sample systems, methods, and apparatuses that embody various elements of the present disclosure. However, it should be understood that the described disclosure may be practiced in a variety of forms in addition to those described herein.

The following disclosure relates generally to molten salt reactor systems, such as those that produce fission products, and systems and methods for removing such fission products out of the molten salt reactor system. A molten salt reactor system may broadly include a collection of components configured to circulate a molten salt along a fuel salt loop. For example, a molten salt reactor system may operate by circulating a molten salt between a reactor vessel (within which fission occurs) and a heat exchanger (for the removal of heat from the fuel salt).

Fissioning nuclides, e.g., uranium-233, uranium-235, and plutonium-239, in the molten salt undergo fission reaction in the reactor vessel of a molten salt reactor to yield fission products which are present in the irradiated fueled molten salt, such as, but not limited to, molybdenum-99, actinium-225, iodine-131, xenon-133, hydrogen-3, nitrogen-13, carbon-14, oxygen-15, fluorine-18, gallium-67, gallium-68, selenium-75, krypton-81m, strontium-89, yttrium-90, technetium-99m, indium-111, iodine-123, iodine-125, samarium-153, erbium-169, and radium-223. The fuel salt loop (sometimes referred to as the coolant loop or molten salt loop) carries the irradiated fueled molten salt from the reactor vessel to the heat exchanger, and the fuel salt loop may be fluidly coupled to one or more other components, such as, but not limited to, a reactor access vessel, a fuel pump, and a drain tank. The amount of fission products in the molten salt increases over time, and as such, it may require removal from the molten salt to decrease the amount of fission products in the molten salt. Additionally, at least some of the fission products, once removed from the molten salt reactor system, may be of value and used in various applications.

One reason for removing fission products from the molten salt is to avoid the continual buildup of fission products, which may cause damage to the reactor of the MSR or inhibit the fission rate of the MSR system (i.e., reduce its power output). Conventional molten salt reactors allow for the buildup of fission products in the molten salt until the molten salt is removed from the molten salt reactor system. The buildup of fission products in the molten salt can cause the fission rate of the molten salt to decline at a faster rate, necessitating an earlier removal of the molten salt and hindering the efficiency of the conventional molten salt reactor system.

Another reason for removing fission products from the molten salt is for the collection of valuable fission products. For example, molybdenum-99 (often referred to as Mo-99) is a unique isotope of molybdenum that gives birth to technetium-99m (Tc-99m) through beta decay. Tc-99m is used in tens of millions of medical diagnostic procedures annually. Conventional MSR systems that allow for the buildup of fission products in the fueled molten salt until the molten salt is removed from the MSR system are inefficient for several reasons, such as requiring a shut down or slowdown of nuclear fission and the loss of fission products during extraction.

The buildup of fission products in the molten salt can inhibit the fission rate of the molten salt through processes such a neutron capture, necessitating an earlier removal of the molten salt and hindering the efficiency of the conventional molten salt reactor system.

One method of removing such fission products from the flow of molten salt is by employing electrochemistry to electrochemically deposit the fission products onto an electrically charged electrode. Such a method may be facilitated by an electrochemical extraction system, such as that described in U.S. patent application Ser. No. 18/604,025 filed Mar. 22, 2024, which is hereby incorporated in its entirety by references. However, it may be advantageous to include a fission product extraction system to a molten salt reactor system that does not require electrically charged electrodes.

To mitigate these and other challenges, the molten salt reactor system of the present disclosure includes an extraction system to remove the fission products from the irradiated fueled molten salt while the molten salt reactor system is at full power (or at any power level), such that fission product buildup issues are lessened. For clarity, as used herein irradiated fueled molten salt refers to molten salt that contains fissile material (e.g., $UF_4$) and has undergone nuclear fission reaction, such that fission products are contained therein. Additionally, irradiated fueled molten salt may sometimes be shortened to fuel salt or simply molten salt. The fission product extraction system of the present invention utilizes electroless deposition to extract fission products contained within the irradiated fueled molten salt. The various fission product extraction systems disclosed herein may utilize metallic structures coated with a reducing agent (such as, but not limited to, beryllium, lithium, or zirconium) to induce a reduction-oxidation (redox) reaction with the fission products to capture the fission product dissolved in the irradiated fueled molten salt. Stated otherwise, the present invention utilizes electroless deposition, sometimes referred to as chemical plating or immersion coating through displacement reaction. The primary difference between electroplating (i.e., electrochemical deposition) and chemical plating is that electroplating requires additional electric current and anodes, while chemical plating is dependent on a reaction occurring on a metallic surface. Electroless deposition traditionally utilizes a bath containing metal ions and chemicals that will reduce the metal ions by redox reaction, causing plating. Electroless deposition is based on redox chemistry and exploits displacement reactions in which the substrate metal is oxidized to soluble ion while ions of the coating metal get reduced and deposited in its place. Notably, the fission products may require an uncoated surface to plate onto.

The redox reaction causes the fission products to plate onto the metallic structure. Upon undergoing the redox reaction, the dissolved fission products are reduced and become solids. Additionally, the reducing agent (e.g., beryllium) is released from the metallic structure and is deposited into the irradiated fueled molten salt. The extraction system may be configured in a manner to allow the irradiated fueled molten salt to flow through or around the metallic structures coated with the reducing agent, which capture the fission products from the molten salt. Further, once the metallic structures coated with a reducing agent have reacted with the fission products to a sufficient degree, the metallic structures may be removed from the molten salt reactor system to allow for 1) the removal of the fission products from the molten salt reactor system and 2) the processing of the fission products into purified isotopes that may be further utilized.

The fission product extraction system may utilize a metallic structure partially coated with the reducing agent in such a way to maximize contact of the uncoated portions with the fission products. For example, the uncoated portions of the metallic structure may face towards or against the flow of irradiated fueled molten salt while the coated portions of the metallic structure face away from the flow of molten salt. The metallic structure may also be designed in such a way to minimize disturbance of the molten salt flow.

An example extraction system may be included on a main loop of a molten salt reactor system or on a component of the molten salt reactor system (e.g., the reactor access vessel). In other embodiments, the example extraction system may include diverting molten salt flow to one or more pipes off the main molten salt reactor loop (i.e., the reactor-reactor access vessel-reactor pump-heat exchanger-reactor vessel loop). Stated otherwise, the fission product extraction system may be positioned on a bypass of the molten salt loop. A valve may control flow into the extraction system, and, if multiple pipes (i.e., bypass) are included in the extraction system, additional valves may be utilized to control flow through each individual pipe. Also, if the extraction system has more than one pipe, the multiple pipes may run in parallel to one another so as to allow for at least one pipe of the one or more extraction pipes to be in operation. Further, the reactor system may be equipped with more than one fission product extraction system or one or more metallic structures, each of which may be placed at relatively the same position of the molten salt loop or may be positioned at multiple different locations of the molten salt loop.

For clarity, the term "downstream" as referred to herein, describes the components relative positions within the molten salt loop, such that irradiated fueled molten salt contacts certain components prior to contacting others. A second component is considered "downstream" of a first component where the flow of molten salt contacts the first component prior to flowing to the second component. Given that the present invention utilizes molten salt (i.e., salt in a liquid or semi-liquid form) one of ordinary skill in the art will appreciate the meaning of downstream and upstream.

In many embodiments, the metallic structures are coated with a reducing agent before inserting the metallic structure into the extraction system. The reducing agent may be beryllium, lithium, zirconium, or other reducing agent known in the art. In the presence of certain fission products, a redox reaction may occur in which the fission product plates out onto or deposits onto the metallic structure and the reducing agent is released into the irradiated fueled molten salt as a suspended species. The outer inert metal surface of the metallic structure acts like the cathode and the reducing agent coated surface of the metallic structure acts like the anode. The metallic structure itself is the metal conductor between the two electrode surfaces and the molten salt is the solution that conducts ions between the two "electrodes."

A molybdenum atom in the irradiated fueled molten salt may have a positive charge ($Mo^{+3}$, $Mo^{+4}$, $Mo^{+6}$, or others). Using $Mo^{6+}$ as an example, $Mo^{6+}$ dissolved in the salt and upon encountering the inert metal surface on the metallic structure (cathode) deposits according to the reduction reaction:

$$Mo^{6+}+6e^{-}\rightarrow Mo^{0}$$

Simultaneously, a beryllium atom on the coated surface of the metallic structure (anode) is oxidized according to the oxidation reaction:

$$Be^{0}\rightarrow Be^{2+}+2e^{-}$$

Electrons released by the beryllium oxidation reaction are consumed by the molybdenum reduction reaction, with the inert metal of the metallic structure serving as the electrical conductor between the two "electrodes" and the irradiated fueled molten salt serving as the ionic conductor connecting the two "electrodes" through the solution. The balanced redox reaction that occurs at this device is $$Mo^{6+}+3Be^{o}\rightarrow Mo^{o}+3Be^{2+}$$

The molybdenum may plate out onto the metallic structure and the beryllium may be released and dissolved in the irradiated fueled molten salt.

This may be advantageous for multiple reasons. First, it is advantageous to collect molybdenum from an MSR system in order to reduce the concentration of fission products contained in the irradiated fueled molten salt which may impede the fission reaction and consequently the power production of the system. Second, the molybdenum captured may include precious molybdenum-99 isotopes, an isotope that, upon beta decay, gives birth to the highly valuable medical radioisotope, technetium-99m. Third, it is advantageous to deposit beryllium into the irradiated fueled molten salt of the MSR system to manage the chemistry of the molten salt. More specifically, during the fission process, a series of reactions occur that results in the conversion of $U^{3+}$ to $U^{4+}$. As this conversion takes place, the ratio of $U^{4+}$ to $U^{3+}$ increases. Prior art suggests that when that ratio exceeds 100:1, the salt becomes corrosive to the stainless steel. Thus, by adding beryllium in known amounts the ratio can be balanced, and corrosion can be avoided.

In the above reaction, six electrons pass from the beryllium atoms (2 electrons from each beryllium atom) through the inert metallic structure to the single molybdenum atom. Similar reactions occur depending on the charge of the molybdenum atom. The metallic structure may be made out of any inert metal, such as, but not limited to, tungsten (or a tungsten carbide), platinum, molybdenum, palladium, etc. Further, the metallic structure may be many different shapes, such as, but not limited to, a microsphere (for an increased surface area) or a cone shape to allow for improved flow dynamics. In certain embodiments, the molybdenum atoms may directly react with the beryllium, so it is beneficial to provide for metallic structures that physically block the molybdenum atoms from interacting directly with the beryllium atoms. Additionally, the metallic structure may be heat resistant (to about 800 °C) and corrosion resistant to function within the molten salt reactor system.

Additionally, the metallic structure may be in electrical isolation from the rest of the structures in the system, including the piping and other components within the system.

Turning to the drawings, for purposes of illustration, FIG. 1 depicts a schematic representation of an example molten salt reactor (MSR) system 100. The molten salt reactor system 100 may implement and include the fission product extraction system (sometimes referred to as the "extraction system"), and implement any of the functionalities of each described herein. As will be understood and appreciated, the example shown in FIG. 1 represents merely one example configuration of a molten salt reactor system 100 in which such extraction systems may be utilized. It will be understood that the extraction systems described herein may be used in and with substantially any other configuration of the molten salt reactor, as contemplated herein. The extraction system may be implemented on nuclear reactor systems other than an MSR system and may extract fission products from other coolants than molten salt. For example, the extraction system may be implemented into reactor systems that utilize water or molten metal as a coolant.

In various embodiments, a molten salt reactor system 100 utilizes fuel salt enriched with uranium (e.g., high-assay low-enriched uranium) to create thermal power via nuclear fission reactions. The MSR system 100 may utilize molten salt as a coolant. In at least one embodiment, the composition of the fuel salt may be $LiF—BeF_2—UF_4$, though other compositions of fuel salts may be utilized as fuel salts within the reactor system 100. The fuel salt within the system 100 is heated to high temperatures (about 700 °C) and melts as the system 100 is heated. This may be accomplished by external heaters and then maintained by fission reaction within the reactor vessel 102. In several embodiments, the molten salt reactor system 100 includes a reactor vessel 102 where the nuclear fission reactions occur within the molten salt, a fuel salt pump 104 that pumps the molten salt to a heat exchanger 106, such that the molten salt re-enters the reactor vessel 102 after flowing through the heat exchanger 106, and piping in between each component (collectively referred to as the molten salt loop). The molten salt reactor system 100 may also include additional components, such as, but not limited to, a drain tank 108 and a reactor access vessel 110. The drain tank 108 may be configured to store the fuel salt once the fuel salt is in the reactor system 100 but in a subcritical state, and also acts as storage for the fuel salt if power is lost in the system 100. The reactor access vessel 110 may be configured to allow for introduction of small pellets of uranium fluoride ($UF_4$) and/or beryllium (Be) to the system 100 as necessary to bring the reactor to a critical state, compensate for depletion of fissile material, and/or manage fuel salt chemistry.

Additionally, the system 100 may include an extraction system 112 and an extraction valve 114 that extend off of the main loop (i.e., the reactor vessel 102, reactor access vessel 110, reactor pump 104, heat exchanger 106, reactor vessel 102 loop) and return to the main loop at a point downstream. In several embodiments, the extraction system 112 is included on a bypass of the molten salt loop with the valve 114 configured to selectively control flow to the bypass. However, in some embodiments, the extraction system 112 is not on a bypass but is placed directly on a portion of the molten salt loop. Although FIG. 1 shows the extraction system 112 connected to piping in between the heat exchanger 106 and reactor vessel 102, other embodiments of the extraction system 112 and molten salt reactor system 100 may include the extraction system 112 at different points on the molten salt loop of the system 100, or may be utilized with a specific component of the system 100 (e.g., attached to the reactor access vessel 110). The extraction valve 114 may be remotely controlled or manually controlled, and opens to allow for irradiated fueled molten salt to flow into the extraction system 112. Additionally, closing the extraction valve 114 may allow for the molten salt to flow out of the extraction system 112 so that the metallic structures may be safely inserted or removed from the extraction system 112. In some embodiments, an inert gas may be pumped into the extraction system 112 after the extraction valve 114 is closed to push the remaining molten salt out of the extraction system 112. In some embodiments, an inert gas may be pumped into the extraction system 112 continually to create a positive pressure therein, which controls the molten salt and prevents it from exiting the molten salt loop.

Figures 2A, 2B:
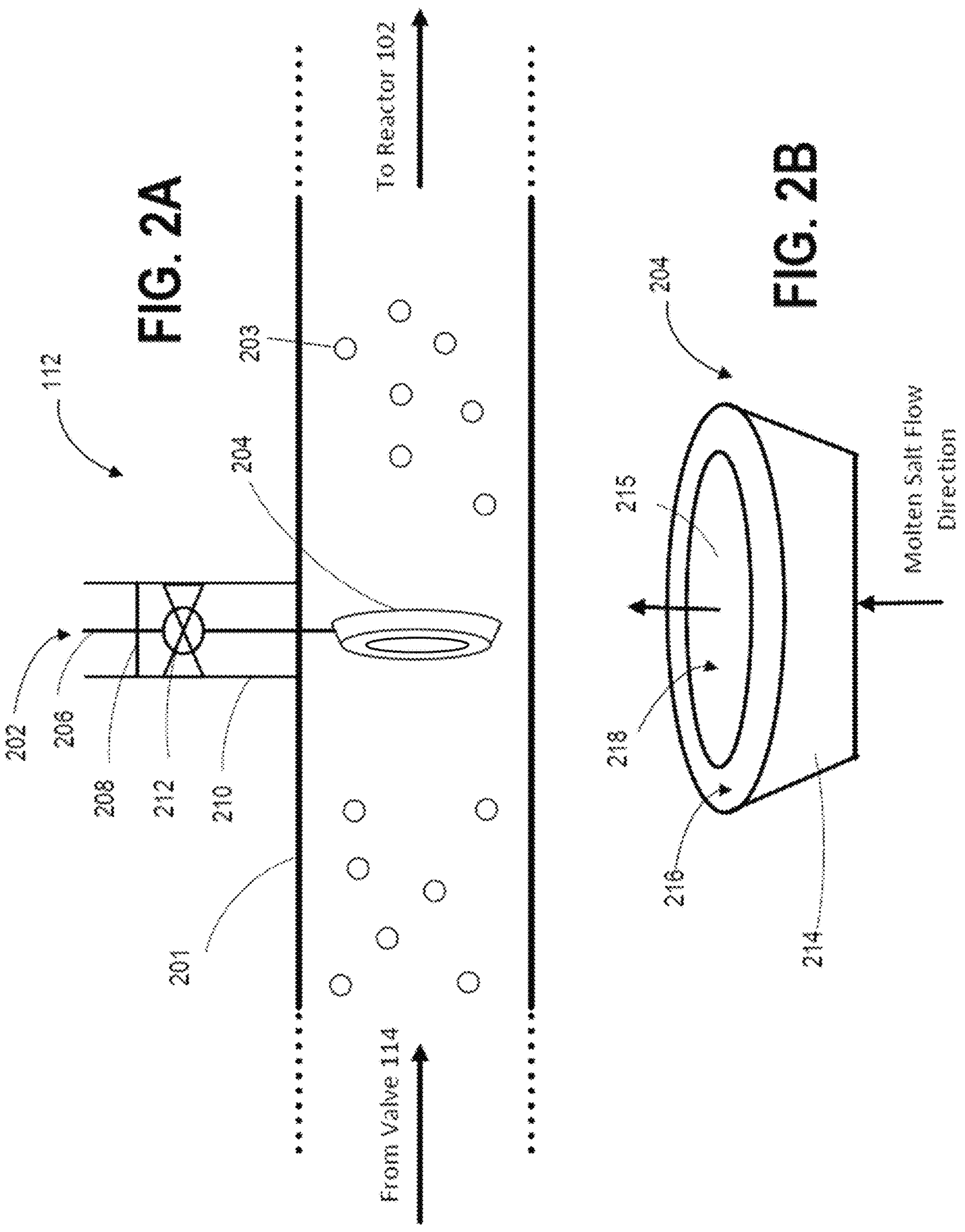
FIG. 2A depicts an example extraction system with an example metallic structure of a reactor system.
FIG. 2B depicts an example metallic structure.

Turning now to FIGS. 2A and 2B, an example extraction system is shown, according to one embodiment of the present disclosure. In many embodiments, the extraction system 112 may include or be coupled to a pipe 201 having irradiated fueled molten salt 203 flowing through the pipe 201 (i.e., the extraction valve 114 is open), and may also include one or more fission product capture systems 202 connected to the pipe 201. In several embodiments, the pipe 201 is the bypass of a molten salt loop of an MSR system. In other embodiments, the pipe 201 is piping to the molten salt loop of an MSR system. In some embodiments, the extraction system employed by the present invention is that of the apparatuses, systems, and methods described in U.S. patent application Ser. No. 18/778,349, filed Jul. 19, 2024 which is hereby incorporated by reference in its entirety. In these embodiments, the metallic structure 204 replaces the coupon to be sampled. Similarly, the metallic structure 204 may be placed within and removed from the flow of molten salt in substantially the same way as the coupon.

In several embodiments, a fission product capture system 202 includes a metallic structure 204, an attachment rod 206, and a salt barrier 208. In many embodiments, the attachment rod 206 is attached to the metallic structure 204 at one end and includes the salt barrier 208 attached near the other end of the attachment rod 206. In at least one embodiment, the extraction system 112 also includes a capture system pipe 210, and the capture system pipe 210 includes a capture system valve 212. The capture system 202 may extend through the capture system pipe 210 and, when in an open position, extend through the capture system valve 212 and into the pipe 201. Specifically, the metallic structure 204 and a portion of the attachment rod 206 pass through the capture system pipe 210, through the open capture system valve 212, and into the pipe 201. In many embodiments, the salt barrier 208 is a substantially flat disk that may have a diameter about the same length of a diameter of the capture system pipe 210 and larger than the capture system valve 212. This prevents the salt barrier 208 from extending through the capture system valve 212 and acts as a barrier for the irradiated fueled molten salt 203 from exiting through the capture system pipe 210. For clarity, the salt barrier 208 may be +/−5 cm of the diameter of the capture system pipe 210, such that it may slide within the capture system pipe 210 while preventing leakage of molten salt. Additionally, the salt barrier 208 may act as a limit on the length to which the attachment rod 206 may extend into the pipe 201 by being of a size not able to extend through the capture system valve 212. In some embodiments, the attachment rod 206 is of a size such that the maximum length to which the metallic structure may be submerged into the pipe 201 is about halfway through the pipe 201. Stated otherwise, the salt barrier 208 acts as a backstop to prevent the metallic structure 204 from being lost in the pipe 201 and to control the depth to which the metallic structure 204 may be submerged in the molten salt flow. In some embodiments, the salt barrier 208 may have some thickness such that the irradiated fueled molten salt 203 does not leak through the salt barrier 208. Additionally, inert gas may be pumped into the capture system pipe 210 to create a pressure differential so that the irradiated fueled molten salt 203 is prevented from flowing through the capture system pipes 210. The capture system valve 212 may be configured to allow passage of the attachment rod 206 and the metallic structure 204 when in the open position but prevent movement of the attachment rod 206 and metallic structure 204 when in a closed position. The capture system valve 212 may be configured to prevent passage of the salt barrier 208 when in the open or closed position.

In multiple embodiments, the capture system valve 212, when in the open position, may have an area or volume large enough to pass the metallic structure 204 and attachment rod 206 through the capture system valve 212. In some embodiments, the capture system valve 212 may be a ball valve or any other type of valve that allows the metallic structure 204 to be inserted into the pipe 201. The capture system valve 212 may be configured to not close or fully close while the metallic structure 204 is in the pipe 201. Once the fission product capture system 202 (i.e., attachment rod 206, metallic structure 204, and salt barrier 208) is removed from the pipe 201 the capture system valve 212 is closed to prevent irradiated fueled molten salt 203 from leaving the system 100 via the capture system pipe 210.

In several embodiments, a portion of the metallic structure 204 may be coated with beryllium, or another reducing agent, prior to being inserted into the extraction system 112, and the metallic structure 204 may be shaped so that the fission products flowing within the molten salt contact the uncoated portion of the metallic structure 204. For example, as shown in FIG. 2B, outer surface 214 and inner surface 215 of the metallic structure 204 are uncoated so the fission products interact directly with and plate onto the inert metal (e.g., tungsten). The metallic structure 204 may define or include an opening 218 through the middle of the metallic structure 204 so that the molten salt flow is not inhibited. In many embodiments, the metallic structure 204 may include a channel 216 in between outer surface 214 and inner surface 215, the surface of which is coated with a reducing agent. The channel 216 having the surface coated with a reducing agent (e.g., beryllium) may be positioned within the pipe 201 such that the molten salt flow interacts with the outer surface 214 and inner surface 215 before interacting with the surface of the channel 216. Stated otherwise, the coated portions of the metallic structure 204 may be downstream of the uncoated portions. As the fission products flow through and around the metallic structure 204, the fission products interact with the uncoated surfaces 214 and 215, initiating the chemical redox reaction, in which the fission products are chemically plated onto the surfaces 214 and 215, while the reducing agent releases from the surface of the channel 216 and is dissolved in the irradiated fueled molten salt. After a certain period of time, or after other parameters are met, the now fission product coated metallic structure 204 may be pulled out of the extraction system 112, and then processed so that the fission products may be utilized.

Additionally, the metallic structure 204 may be electrically isolated from the other structures and components of the extraction system 112, including the pipe 201, the attachment rod 206, and all of the other components of the fission product capture system 202. In many embodiments, the attachment rod 206 may be a ceramic rod, or some other non-conducting material.

The metallic structure of the extraction system may be configured in a number of different geometric configurations based on the need. Deposition of fission products onto the metallic structure may require physical contact with the metallic structure. While it may be desirable to maximize contact with the metallic structure the flow of the molten salt must not be too disturbed as to cause damage to the MSR system (i.e., by increasing pressure within the system). Therefore, the present invention contemplates a plurality of metallic structure configurations, positions, and shapes to balance these needs.

Figure 3A:
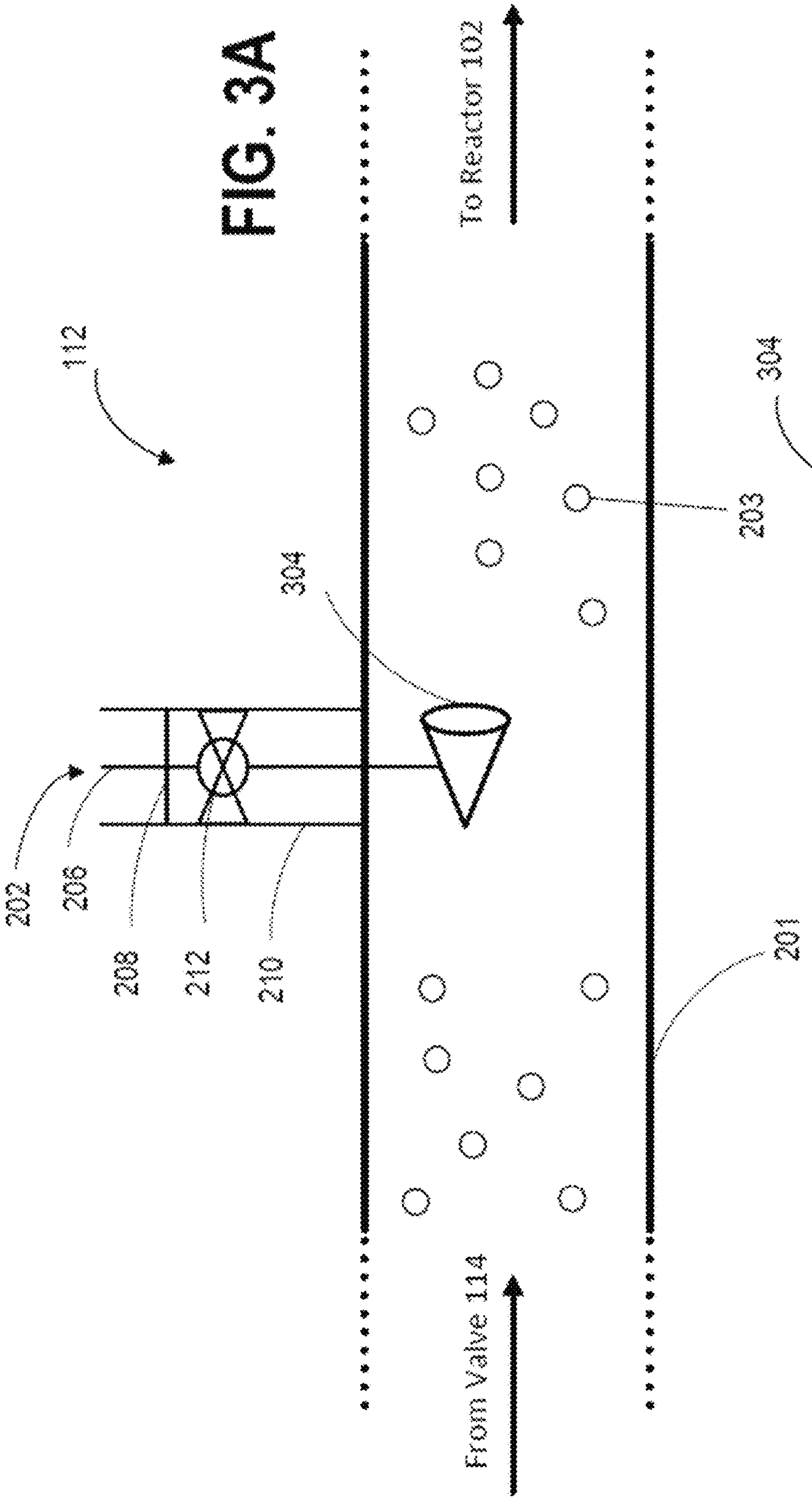
FIG. 3A depicts an example extraction system with another example metallic structure of a reactor system.
Figure 3B:
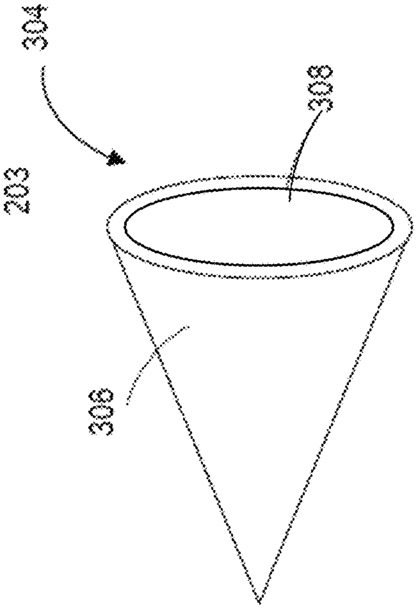
FIG. 3B depicts another example metallic structure.

Turning to FIGS. 3A and 3B, another example metallic structure 304 is depicted in the extraction system 112. Metallic structure 304 may be substantially analogous to metallic structure 204, in that it includes an uncoated surface 306 and a reducing agent (e.g., beryllium) coated surface 308, and is connected to the attachment rod 206 so that metallic structure 304 may be inserted and removed from the pipe 201 using similar methods as those described to insert and remove metallic structure 204 from pipe 201. Metallic structure 304 may be a cone, such that irradiated fueled molten salt only flows around the metallic structure 304, causing the fission products to interact with the uncoated surface 306, initiating the chemical redox reaction, in which the fission products are deposited onto the surfaces 306 by electroless deposition, while the reducing agent (e.g., beryllium) releases from the coated surface 308 and is dissolved in the molten salt. The metallic structure 304 may have a solid bottom surface that is the reducing agent coated surface 308, or the metallic structure 304 may have a hollow cone body in which the reducing agent coated surface 308 is an interior surface of the hollow cone body. The reducing agent coated surface 308 is positioned within the pipe 201 such that the molten salt flow interacts with the uncoated surface 306 before interacting with the coated surface 308.

Figures 4A, 4B:
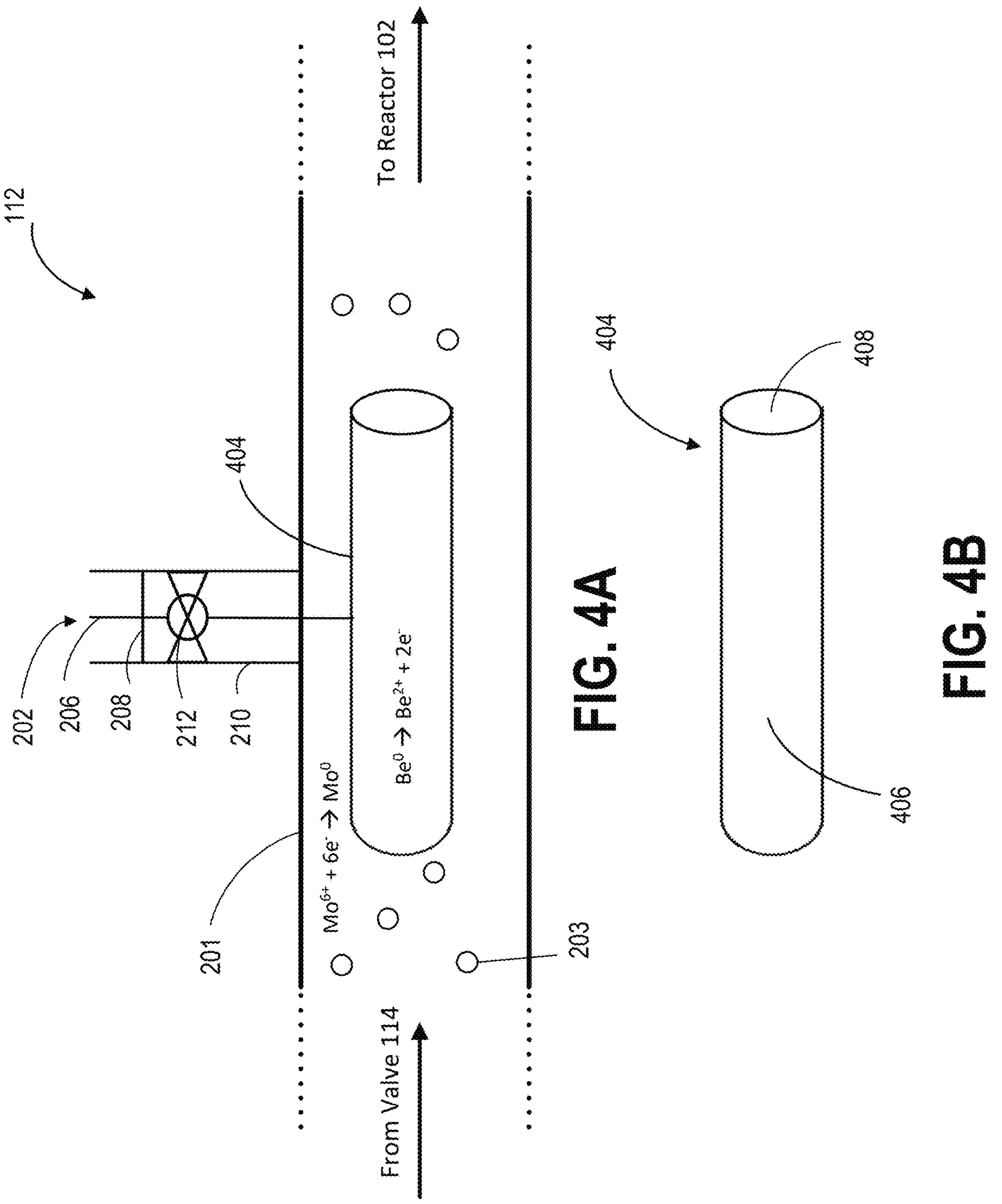
FIG. 4A depicts an example extraction system with another example metallic structure of a reactor system.
FIG. 4B depicts another example metallic structure.

Turning to FIGS. 4A and 4B, another example metallic structure 404 is depicted in the extraction system 112. Metallic structure 404 may be substantially analogous to metallic structures 204 and 304, in that it includes an uncoated surface 406 and a reducing agent (e.g., beryllium) coated surface 408, and is connected to the attachment rod 206 so that metallic structure 404 may be inserted and removed from the pipe 201 using similar methods as those described to insert and remove metallic structure 204 from pipe 201. Metallic structure 404 may be a rounded cylinder, such that molten salt only flows around the metallic structure 404, causing the fission products to interact with the uncoated surface 406, initiating the chemical redox reaction, in which the fission products are chemically plated onto the surfaces 406, while the reducing agent releases from the inner coated surface 408 and is dissolved in the irradiated fueled molten salt. The metallic structure 404 may be a hollow cylinder such that the inner coated surface 408 runs the length of the cylinder, or may have a solid end cap that is the inner coated surface 408.

Figure 5A:
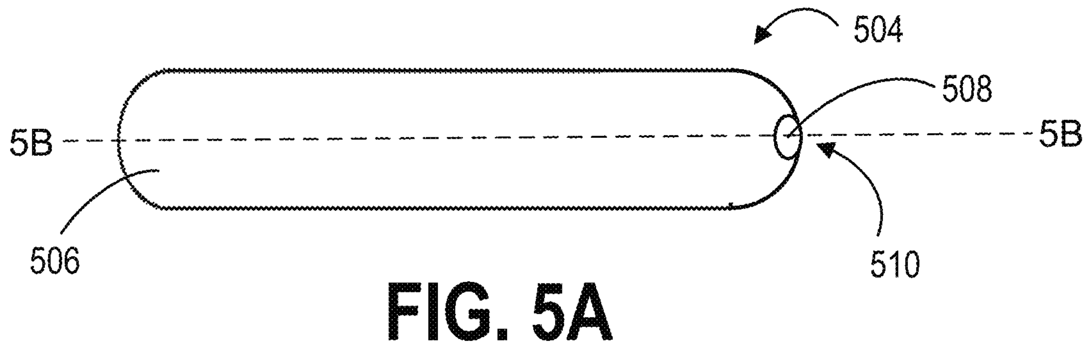
FIG. 5A depicts another example metallic structure.
Figure 5B:
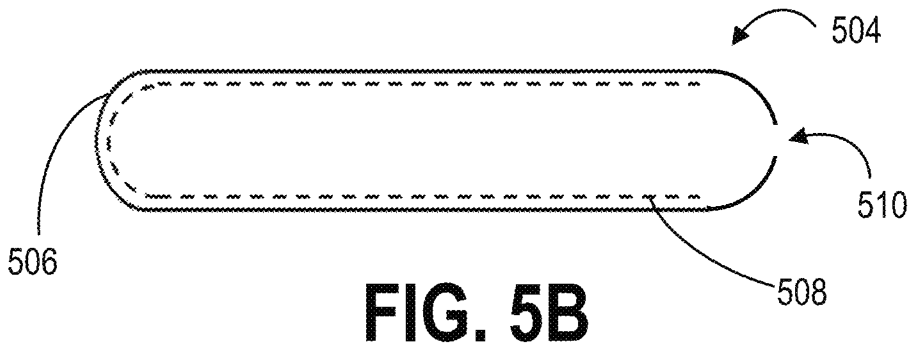
FIG. 5B depicts a cross-section of the metallic structure of FIG. 5A along line 5B.

Turning to FIGS. 5A and 5B, another example metallic structure 504 is depicted in the extraction system 112. Metallic structure 504 may be substantially analogous to metallic structures 204, 304, and 404 in that it includes an uncoated surface 506 and a reducing agent coated surface 508, and is connected to the attachment rod 206 so that metallic structure 504 may be inserted and removed from the pipe 201 using similar methods as those described to insert and remove metallic structure 204 from pipe 201. Metallic structure 504 may be a hollow capsule shape, such that irradiated fueled molten salt only flows around the metallic structure 504, causing the fission products to interact with the uncoated surface 506, initiating the chemical redox reaction, in which the fission products are chemically plated onto the surfaces 506, while the reducing agent (e.g., beryllium) releases from the inner coated surface 508 and is dissolved in the irradiated fueled molten salt. In several embodiments, the interior of the metallic structure 504 is coated with a reducing agent while the exterior surface 506 is uncoated. Advantageously, this may maximize the contact of the fission products with the uncoated surface 506 while also maximizing the surface area that is coated with the reducing agent. In these embodiments, the metallic structure 504 may also include an opening 510 on an end side of the metallic structure 504 downstream of a front side of the metallic structure 504. Following electroless deposition of the fission products, the reducing agent (beryllium) may exit the metallic structure 504 from the opening 510.

The opening 510 may also limit the salt in the interior from mixing with the salt from the exterior, and the inner coated surface 508 is in the interior of the hollow capsule-shaped metallic structure, as shown in FIG. 5B. When the fission products interact with the uncoated surface 506, the reducing agent releases from the inner coated surface 508 and flows out of the opening 510.

Figure 6:
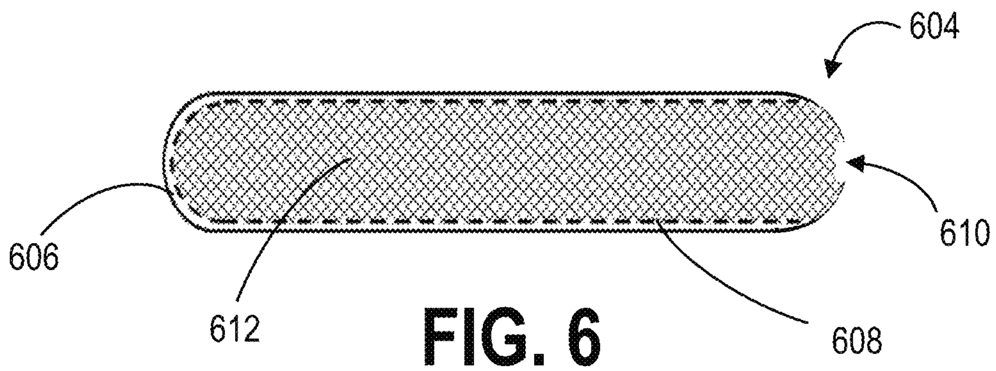
FIG. 6 depicts another example metallic structure.

Turning to FIG. 6, another example metallic structure 604 is depicted in the extraction system 112. Metallic structure 604 may be substantially analogous to metallic structures 204, 304, 404, and 504, in that it includes an uncoated surface 606, a reducing agent coated surface 608 (dashed line in FIG. 6), and an opening 610 (equivalent to the opening 510 of structure 504), and is connected to the attachment rod 206 so that metallic structure 604 may be inserted and removed from the pipe 201 using similar methods as those described to insert and remove metallic structure 204 from pipe 201. The metallic structure 604 may be a hollow capsule shape having an interior and exterior. The interior of metallic structure 604 may include a reducing agent (e.g., beryllium) coated surface 608 and a porous structure 612 that is made of an inert metal (e.g., same inert metal as uncoated surface 606 or other inert metal). The porous structure 612 may also be coated with a reducing agent. The porous structure 612 may have pores large enough so that the irradiated fueled molten salt permeates all the interior of the metallic structure 604 and coats all of the surfaces of the reducing agent coated surface 608 and the surfaces of the porous structure 612. In at least one embodiment, the porous structure 612 may be a mesh-shape, or may be a plurality of inert metal spheres (e.g., microspheres) fused together, or some other shape that includes a high surface-to-volume ratio.

The metallic structure 604 may be aligned so that the irradiated fueled molten salt flows around the metallic structure 604, causing the fission products to interact with the uncoated surface 606, initiating the chemical redox reaction, in which the fission products are chemically plated onto the surfaces 606, while the reducing agent releases from the inner coated surface 608 and porous structure 612 and is dissolved in the irradiated fueled molten salt. In several embodiments, the porous structure 612 is in contact with the reducing agent coated surface 608 so that when the fission products contact the uncoated surface 606, there is electrical contact with the porous structure 612 such that the electrons from the reducing agent coated porous structure 612 can flow to the fission products on the uncoated surface 606.

Figure 7:
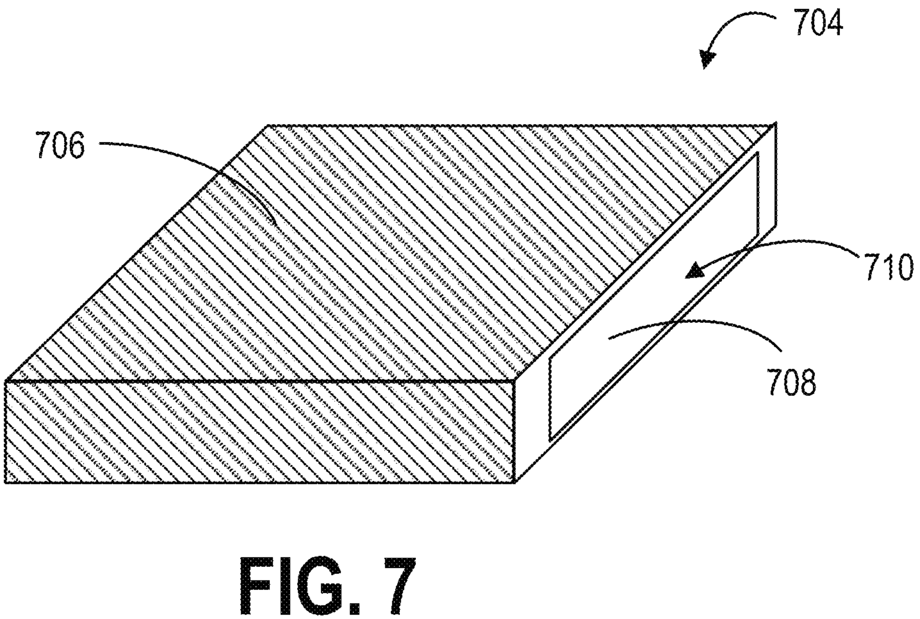
FIG. 7 depicts another example metallic structure.

Turning to FIG. 7, another example metallic structure 704 is depicted in the extraction system 112. Metallic structure 704 may be substantially analogous to metallic structures 204, 304, 404, 504, and 604, in that it includes an uncoated surface 706, a reducing agent coated surface 708, and an opening 710, and is connected to the attachment rod 206 so that metallic structure 704 may be inserted and removed from the pipe 201 using similar methods as those to insert and remove metallic structure 204 from pipe 201. Metallic structure 704 may be a hollow rectangular prism having one open side 710. The metallic structure is aligned in the pipe 201 such that irradiated fueled molten salt flows around the metallic structure 704, causing the fission products to interact with the uncoated surface 706, initiating the chemical redox reaction, in which the fission products are chemically plated onto the surfaces 706, while the reducing agent releases from the inner coated surface 708 of the interior of the hollow rectangular prism and flows out of the opening 710 and is dissolved in the irradiated fueled molten salt. In one embodiment, a porous structure (similar to porous structure 612) may be affixed on the interior of the metallic structure 704.

Figure 8:
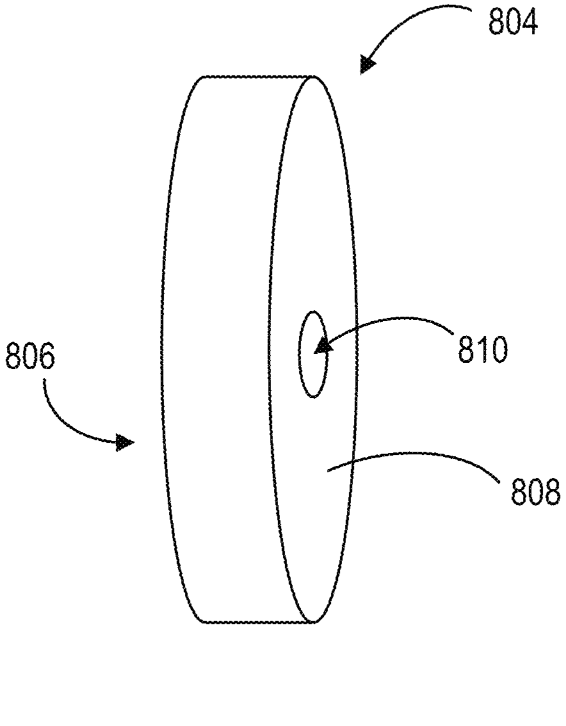
FIG. 8 depicts yet another example metallic structure.

Turning to FIG. 8, another example metallic structure 804 is depicted in the extraction system 112. Metallic structure 704 may be substantially analogous to metallic structures 204, 304, 404, 504, 604, and 704, in that it includes an uncoated surface 806, a reducing agent coated surface 808, and an opening 810, and is connected to the attachment rod 206 so that metallic structure 804 may be inserted and removed from the pipe 201 using similar methods as those described to insert and remove metallic structure 204 from pipe 201. Metallic structure 804 may be a shallow cylinder or disc-shape, having an opening 810 through the center of the metallic structure 804. The metallic structure is aligned in the pipe 201 such that reducing agent coated surface 808 is positioned downstream of the molten salt flow, relative to the uncoated surface 806. The irradiated fueled molten salt flows around the metallic structure 804 or through the opening 810, causing the fission products to interact with the uncoated surface 806, initiating the chemical redox reaction, in which the fission products are chemically plated on the surfaces 806, while the reducing agent releases from the coated surface 808 and dissolves in the irradiated fueled molten salt. In one embodiment, a porous structure (similar to porous structure 612) may be affixed on the reducing agent coated surface 808.

Figure 9:
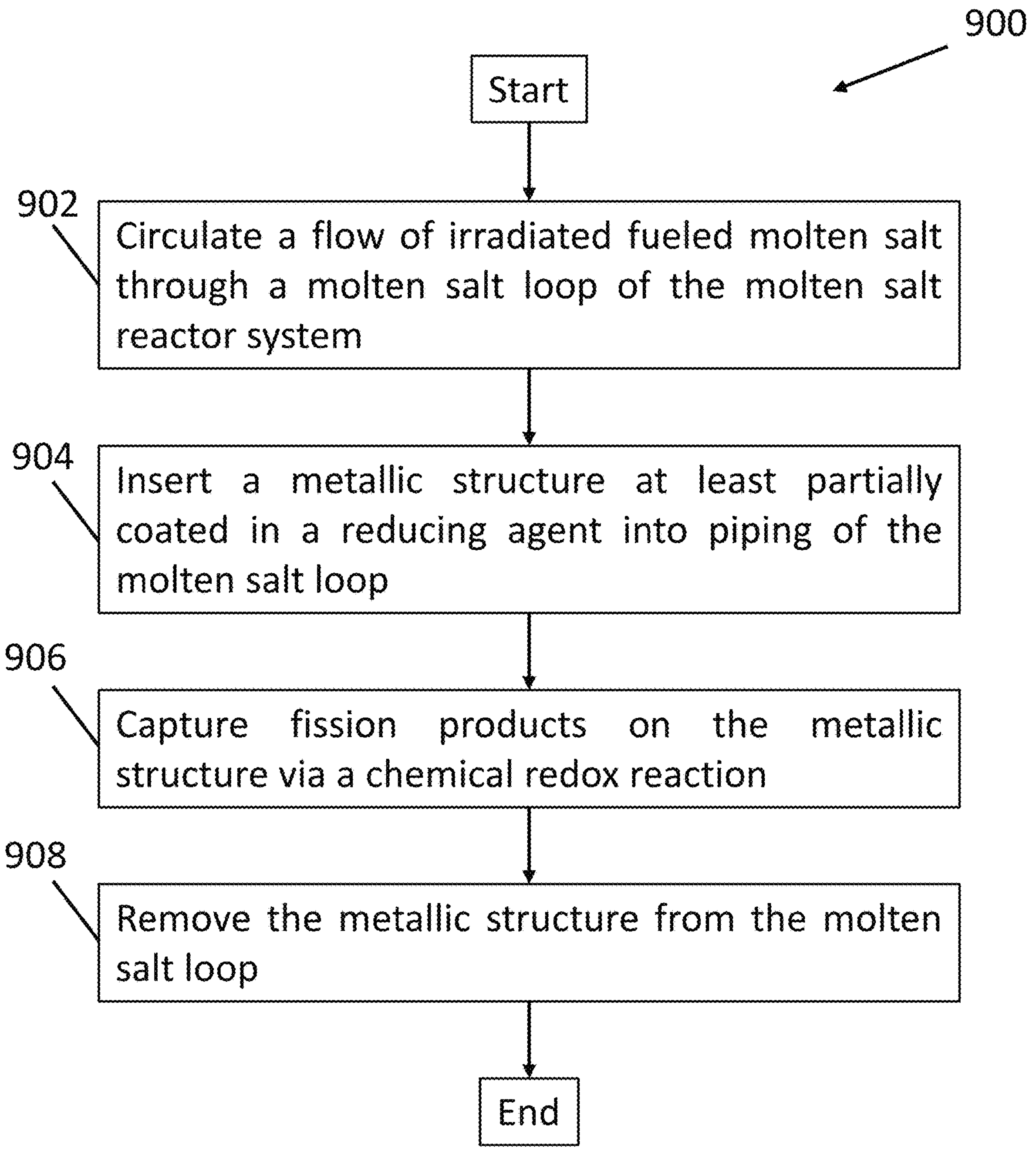
FIG. 9 depicts a flow chart of an example method for capturing fission products with an example extraction system on an example molten salt reactor.

Turning now to FIG. 9, a method 900 for capturing fission products from irradiated fueled molten salt of an example molten salt reactor is described, according to one embodiment of the present disclosure. At step 902, a flow of irradiated fueled molten salt is circulated through a molten salt loop of a molten salt reactor system. In this step, a nuclear reactor, such as molten salt reactor system 100, may be used to produce the fission products via nuclear fission reaction.

In several embodiments, at step 902, metal ion fission products are created in the molten salt reactor. As described herein, the fission in the molten salt results in various fission products that stay in the irradiated fueled molten salt and circulate through the molten salt loop of the molten salt reactor system.

In many embodiments, at step 904, one or more metallic structures of the fission products capture systems 202 may be inserted into piping of the molten salt loop. The metallic structure of method 900 may be metallic structure 204 (or 304, 404, 505, 604, 704, 804, or any other metallic structure). The metallic structure of step 904 may be a component to any of the extraction systems described here (e.g., extraction system 112). For example, the metallic structure may be extended through the capture system pipe 210 and into the pipe 201.

In some embodiments, at step 904 extraction valve 114 is opened so that irradiated fueled molten salt 203 may flow into and through the extraction system 112 so that the fission products may be captured.

In several embodiments, at step 906, the fission products within the irradiated fueled molten salt 203 may be captured by reacting with the metallic structure (e.g., 204, 304, 404, 505, 604, 704, 804, or any other metallic structure) in a chemical redox reaction so that the fission products plate out on the metallic structure and the reducing agent is dislodged from the metallic structure and dissolved in the irradiated fueled molten salt. In several embodiments, at step 906, fission products are captured via electroless deposition. For example, the metallic structure may be at least partially coated with beryllium and, upon contact with an uncoated portion of the metallic structure, molybdenum ions may be reduced and consequently chemically plate onto the uncoated portion, resulting in the uncoated portion being coated with molybdenum and the beryllium being dislodged from the metallic structure and into the irradiated fueled molten salt.

Advantageously, this has the effect of capturing valuable fission products from the flow of irradiated fueled molten salt (e.g., molybdenum-99), reducing the amount of fission products within the irradiated fueled molten salt (i.e., promoting efficient power production), and supplying the MSR system with beryllium to balance the chemistry of the molten salt.

In one or more embodiments, prior to step 908, molten salt flow is halted in the extraction system 212 by closing the extraction valve 114.

In several embodiments, at step 908, the metallic structure (e.g., 204, 304, 404, 505, 604, 704, 804, or any other metallic structure) containing the captured fission products is removed from the extraction system 112. For example, the metallic structure may be removed by pulling the attachment rod 206 up through the capture system pipe 210 so that the metallic structure 204 is pulled out of the pipe 201 and through the capture system valve 212. Additionally, each of the one or more capture system valves 212 may be closed once the metallic structure 204 is removed from the extraction system 112.

Though Mo-99 is generally used as an example fission product within the disclosure, the systems and methods as described herein may be utilized to isolate and process any fission product created in any reactor system (e.g., MSR system). Table 1 below shows a non-exhaustive list of potential fission products that may be captured and extracted using the disclosed systems and methods:

TABLE 1

| Isotope | Medical Applications | Radiation | Half-life |
|---|---|---|---|
| Hydrogen-3 | Many | Beta | 12.32 years |
| Nitrogen-13 | Myocardial blood flow imaging | PET | 9.965 minutes |
| Carbon-14 | studying abnormalities that underline diabetes, gout, anemia and acromegaly; insufflation gas for procedures like endoscopies; and more | Beta/Gamma | 5700 years |
| Oxygen-15 | Blood flow imaging | PET | 122.24 seconds |
| Fluorine-18 | Used to diagnose cancer, heart disease, and epilepsy | PET (positron) | 109.77 minutes |
| Gallium-67 | Imaging of tumors and infections | Gamma | 3.2617 days |
| Gallium-68 | Imaging of tumors and infections | Positron | 68 minutes |
| Selenium-75 | Many | Gamma | 119.78 days |
| Krypton-81m | Pulmonary imaging | Gamma | 13.1 seconds |
| Strontium-89 | Bone metastases | Beta | 50.563 days |
| Yttrium-90 | Treatment of arthritis | Beta | 64.053 hours |
| Technetium-99m | Many | Gamma | 6.0067 hours |
| Molybdenum-99 | Many | Beta | 65.976 hours |
| Indium-111 | Many | Gamma | 2.8047 days |
| Iodine-123 | Many | Gamma | 13.22 hours |
| Iodine-125 | Clot imaging | Gamma | 59.5 days |
| Iodine-131 | Many | Beta/Gamma | 8.025 days |
| Xenon-133 | Many | Gamma | 2.198 days |
| Samarium-153 | Bone metastases | Beta/Gamma | 46.284 hours |
| Erbium-169 | Treatment of arthritis | Beta | 9.392 days |
| Radium-223 | Bond cancer therapy | Alpha | 11.43 days |

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A molten salt reactor system comprising:

a fuel salt system comprising a molten salt loop, wherein the molten salt loop comprises piping, an access vessel, a reactor core, a pump, and at least one heat exchanger, wherein the fuel salt system is configured to circulate an irradiated fueled molten salt comprising fission products through the molten salt loop; and a fission product extraction system fluidly coupled to the piping of the molten salt loop, the fission product extraction system comprising:

a pipe fluidly connected to the piping of the molten salt loop;

a metallic structure partially coated in a reducing agent and extending into the pipe such that the metallic structure makes contact with the irradiated fueled molten salt; and a removable rod connected to the metallic structure;

wherein the reducing agent comprises a solid material disposed on a surface of the metallic structure; and wherein the fission product extraction system is configured to capture the fission products by redox reaction between the reducing agent and the fission products without application of electrical potential to the metallic structure such that the fission products plate onto the metallic structure.

2. The molten salt reactor system of claim 1, wherein the metallic structure is configured to release the reducing agent into the irradiated fueled molten salt upon the redox reaction with the fission products.

3. The molten salt reactor system of claim 1, wherein the fission products are one or more of molybdenum-99, actinium-225, iodine-131, xenon-133, hydrogen-3, nitrogen-13, carbon-14, oxygen-15, fluorine-18, gallium-67, gallium-68, selenium-75, krypton-81m, strontium-89, yttrium-90, technetium-99m, indium-111, iodine-123, iodine-125, samarium-153, erbium-169, and radium-223.

4. The molten salt reactor system of claim 1, wherein the solid material comprises at least one of beryllium, lithium, and zirconium.

5. The molten salt reactor system of claim 1, wherein the solid material comprises neutral beryllium and the fission products comprise cationic molybdenum, and wherein the redox reaction occurs between the cationic molybdenum and the neutral beryllium.

6. The molten salt reactor system of claim 1, wherein the metallic structure comprises tungsten, platinum, molybdenum, or palladium.

7. The molten salt reactor system of claim 1, wherein the pipe is connected to the piping of the molten salt loop via a bypass of the molten salt loop.

8. The molten salt reactor system of claim 7, further comprising a bypass valve configured to selectively control flow of the irradiated fueled molten salt to the bypass.

9. The molten salt reactor system of claim 7, wherein the bypass is downstream of the reactor core.

10. The molten salt reactor system of claim 1, wherein the fission product extraction system further comprises a capture system valve that, when in an open position, defines an opening sized to enable passage of the metallic structure and the removable rod through the capture system valve.

11. The molten salt reactor system of claim 10, wherein the fission product extraction system further comprises a capture system pipe, and wherein the metallic structure and the removable rod pass through the capture system pipe and through the capture system valve into the pipe connected to the piping of the molten salt loop.

12. The molten salt reactor system of claim 1, wherein the fission product extraction system further comprises a salt barrier connected to the removable rod, and wherein the salt barrier is a nonpermeable disk having a diameter within 5 cm of a diameter of the pipe.

13. The molten salt reactor system of claim 1, wherein the metallic structure is positioned within the pipe such that the irradiated fueled molten salt contacts an uncoated portion of the metallic structure that is not coated in the reducing agent before contacting a coated portion of the metallic structure that is coated in the reducing agent.

14. The molten salt reactor system of claim 1, wherein the removable rod comprises a non-conducting material.

15. The molten salt reactor system of claim 14, wherein the removable rod is a ceramic rod.

* * * * *